Sept. 6, 1938.   H. F. GEORGE ET AL   2,129,087
LOCK KEY CUTTING MACHINE
Filed June 7, 1935    4 Sheets-Sheet 1
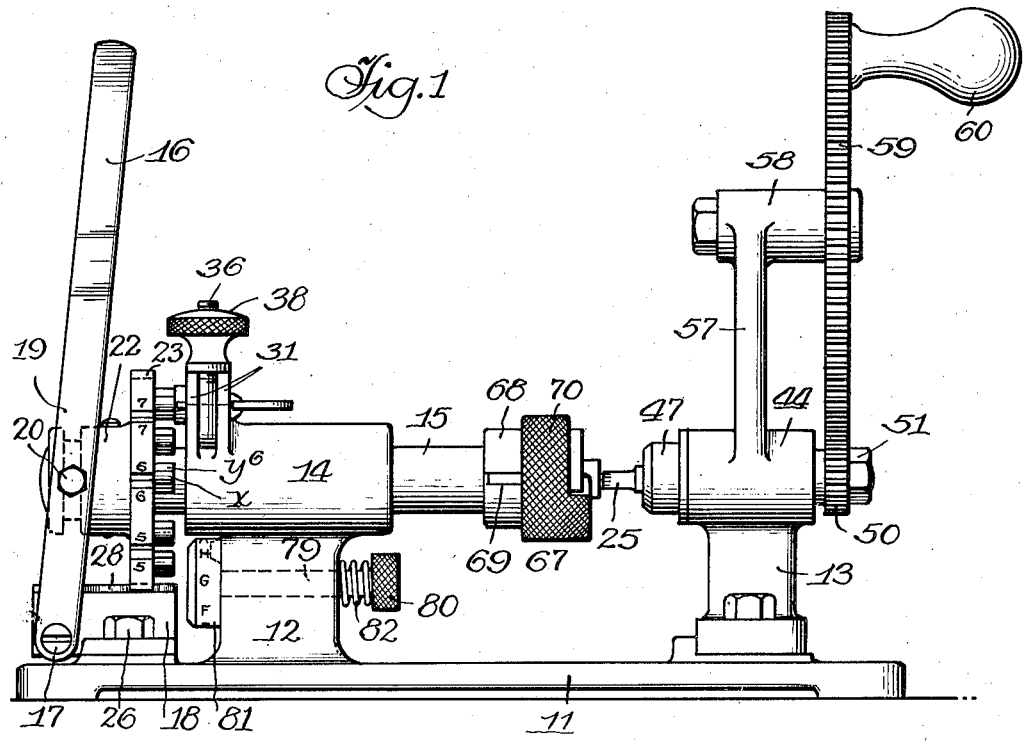
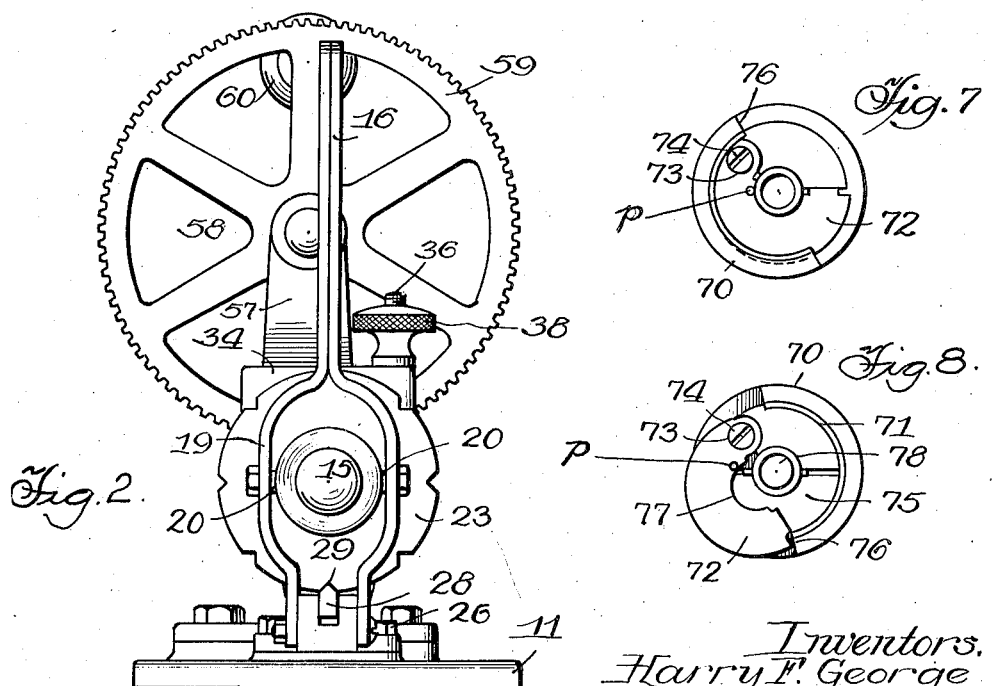
Inventors.
Harry F. George
and Julius G. Howard,
By Parkinson & Lane, Attys.

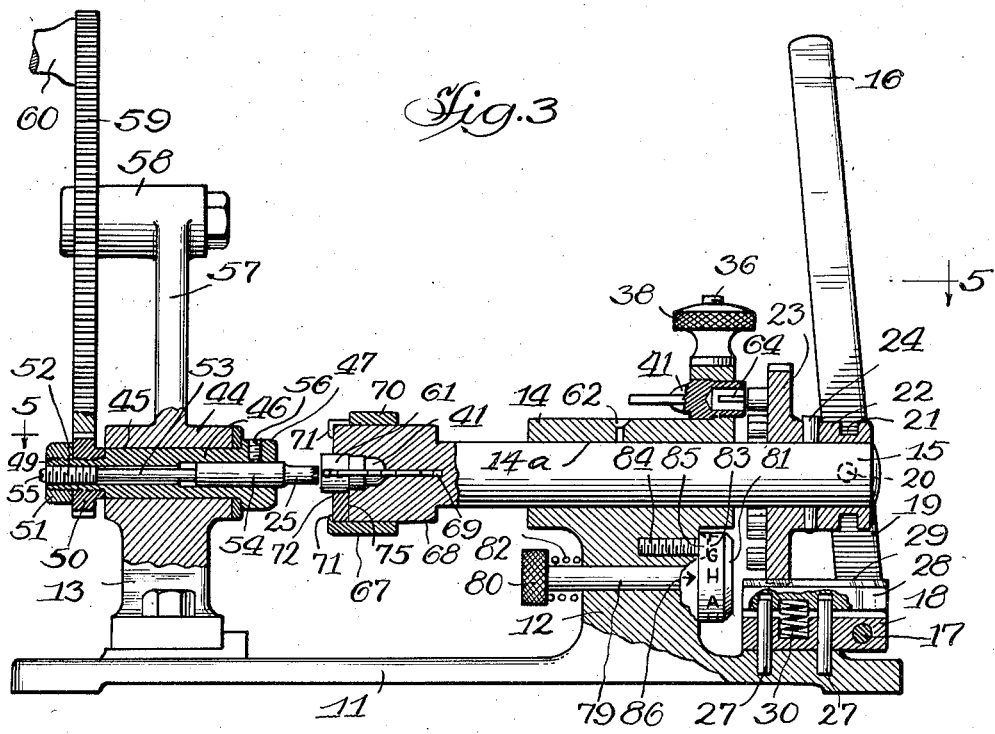
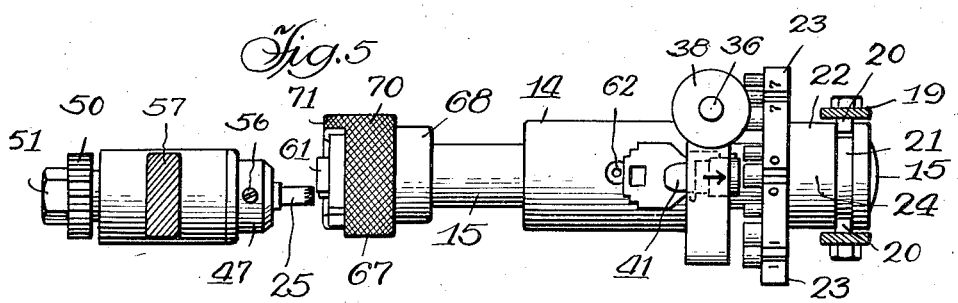
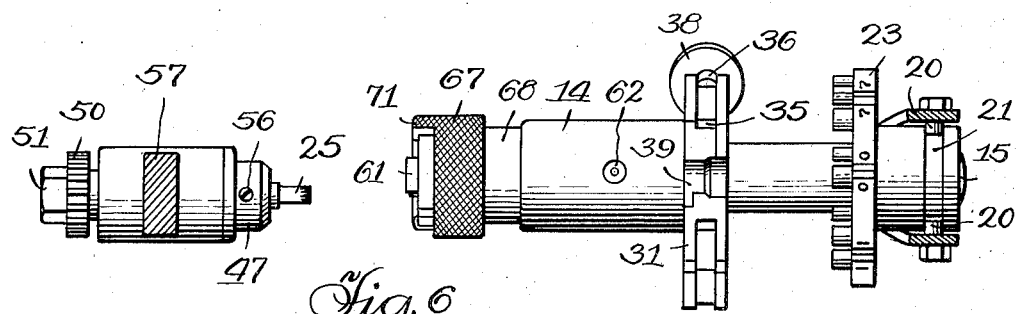

Sept. 6, 1938.  H. F. GEORGE ET AL  2,129,087
LOCK KEY CUTTING MACHINE
Filed June 7, 1935  4 Sheets-Sheet 3
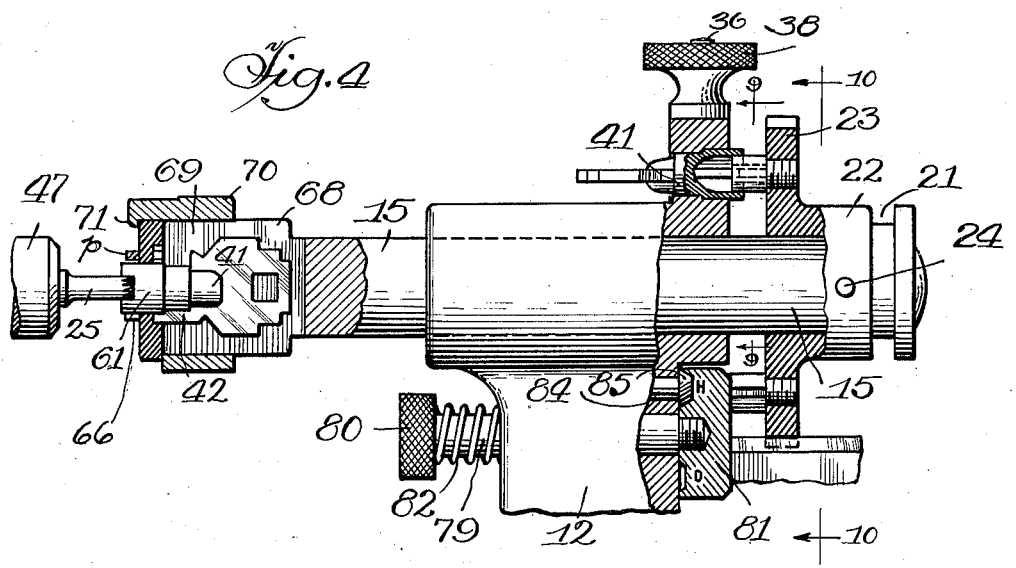
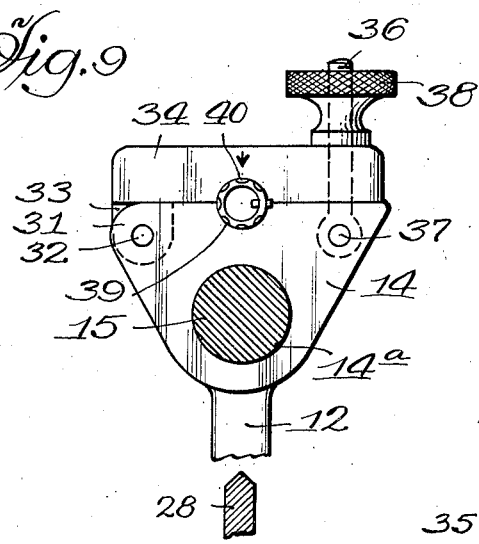
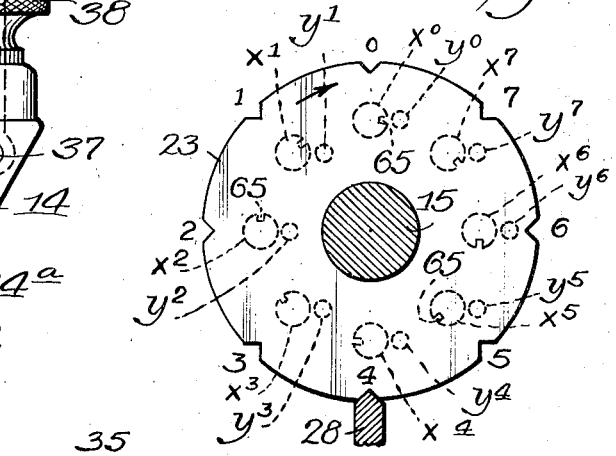
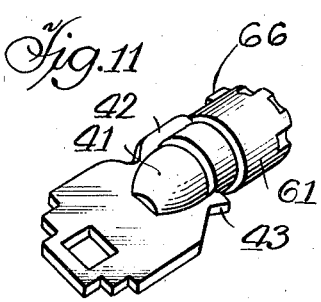
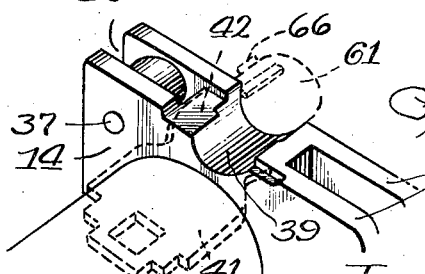
Witness:
Chas. R. Koursh.
Inventors,
Harry F. George,
Julius G. Howard,
By Parkinson + Lane, Attys.

Sept. 6, 1938.  H. F. GEORGE ET AL  2,129,087
LOCK KEY CUTTING MACHINE
Filed June 7, 1935    4 Sheets-Sheet 4
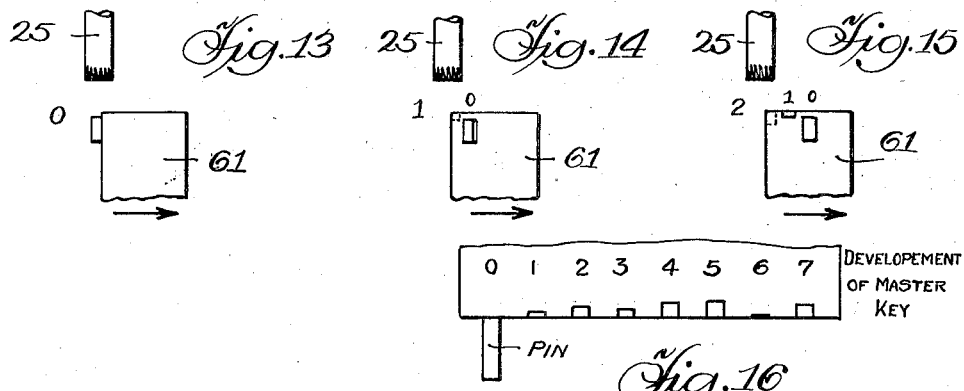
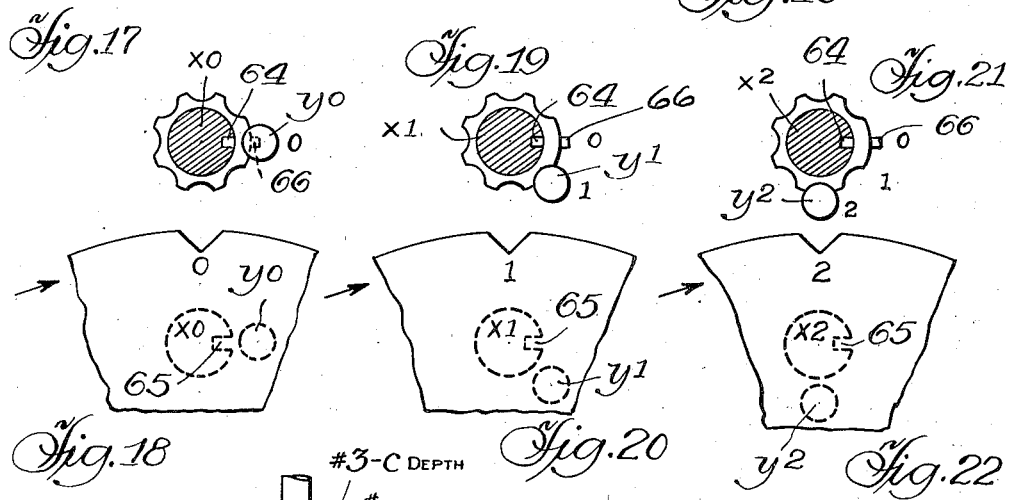
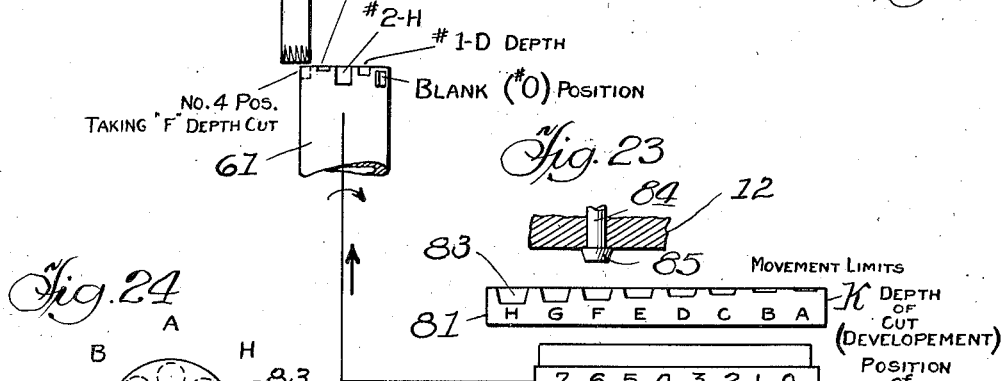
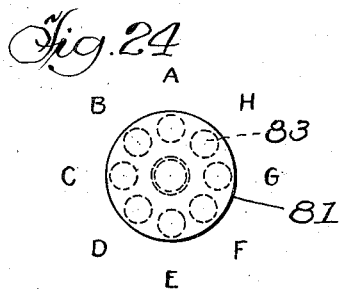

Patented Sept. 6, 1938

2,129,087

UNITED STATES PATENT OFFICE 2,129,087

LOCK KEY CUTTING MACHINE

Harry F. George and Julius G. Howard, Chicago, Ill.

Application June 7, 1935, Serial No. 25,387

20 Claims. (Cl. 90—13.05)

This invention relates to a lock key cutting machine, and more particularly to the use of and machine for cutting keys from tubular blanks.

Among the objects of our invention is to provide a machine for cutting keys from blanks by using one of the already formed keys as a master key to gauge the depth of cuts in the key blank being cut.

Another object of our invention is to provide such a machine that the key blanks may be properly cut by a code instead of from a master key.

A further object is to provide improved means for accurately determining the depth of cut in the various different depth grooves to be cut in the key blank.

A still further object is to provide improved means for accurately positioning and holding the master key.

Another object is to provide an improved chuck for securely and accurately holding the key blank being cut.

A still further object is the provision of improved means for properly and accurately cutting away the metal of the blank for the different cuts of various depth.

Another object is to provide means for selectively cutting a key blank either from a master key or from code as desired.

Other objects, advantages and capabilities will later more fully appear.

Our invention further resides in the combination, construction and arrangement of parts illustrated in the accompanying drawings, and while we have shown therein a preferred embodiment we wish it understood that the same is susceptible of modification and change without departing from the spirit of our invention.

In the drawings:—

Fig. 1 is a side elevation of a lock key cutting machine embodying our invention.

Fig. 2 is an end elevation of the machine shown in Fig. 1 and looking toward the left-hand end of Fig. 1.

Fig. 3 is a longitudinal vertical section of our improved machine, certain of the parts being shown in elevation for the sake of clearness.

Fig. 4 is a side elevation partly in vertical section, of the controlling mechanism and the cutting mechanism.

Fig. 5 is a sectional view on the line 5—5 of Fig. 3.

Fig. 6 is a view similar to Fig. 5 but showing the key blank moved away from the drill and the master key clamping device in open position and the master key removed.

Fig. 7 is a face view of the blank key chuck in closed position, with a blank key held therein.

Fig. 8 is a view similar to Fig. 7 but showing the chuck in open position.

Fig. 9 is a front elevation of the master key clamping device and showing a master key clamped therein.

Fig. 10 is a view looking at the back face of the controlling plate and showing the control pins in dotted lines.

Fig. 11 is a perspective view of a master key.

Fig. 12 is a detail view of the master key clamping device with the movable clamping jaw removed and showing the master key in dotted lines.

Fig. 13 is a diagrammatic view of the cutter and a portion of the key blank showing the key blank in 0 position.

Fig. 14 is a similar view showing the key blank rotated to the No. 1 position.

Fig. 15 is a similar view showing the key blank rotated to the No. 2 position.

Fig. 16 is a fragmentary development of the tubular end of the key blank and showing one arrangement of recesses cut thereinto during the cutting of the key in the key blank.

Fig. 17 is a diagrammatic elevation of the end of a completed key and showing the relation to the key of the gauge pins for the 0 position.

Fig. 18 is a fragmentary view of the back face of the control plate and showing in dotted lines the arrangement of the gauge pins for the 0 position and corresponding to their position shown in Fig. 17.

Fig. 19 is a view similar to Fig. 17 but showing the gauge pins in the No. 1 position.

Fig. 20 is a view similar to Fig. 18 but like Fig. 19 showing the gauge pins in the No. 1 position.

Fig. 21 is a view similar to Figs. 17 and 19 but showing the gauge pins in the No. 2 position.

Fig. 22 is a view similar to Figs. 18 and 20 but showing the gauge pins in the No. 2 position.

Fig. 23 is a diagrammatic view showing the general relation between the cutter, the key blank, the master plate and the control plate for use when cutting keys by code instead of by use of a master key.

Fig. 24 is a view of the rear side of the master plate showing the spacing arrangement of the holes therein for use in cutting keys by code.

Referring more in detail to the drawings and more particularly Figs. 1 to 3, my lock key cutting machine comprises the base member 11 having secured at one end thereof the upstanding pedestal 12 and at the other end the upstanding pedestal 13. At the top of pedestal 12 is formed, integral or otherwise as desired, a head 14 formed with a bore 14a, in which is rotatably mounted shaft 15. Shaft 15 is also longitudinally slidable in head 14 (see Fig. 3), this longitudinal sliding movement being effected by a lever 16, pivoted at its lower end at 17 to a support 18, which in turn is secured to the base member 11.

As seen in Fig. 2 lever 16 is formed adjacent its lower end with the yoke portion 19, which yoke carries the inwardly extending pins 20, the inner ends of which have sliding engagement with the circumferential groove 21 formed in the head 22 of the control plate 23. Control plate 23 is fixed by means of pin 24 (or otherwise as desired) to shaft 15 to rotate therewith. As will be understood, this arrangement permits control plate 23 and shaft 15 to be rotated to bring into operative position any one of the sets of gauge pins hereinafter more fully described, and also permits through the medium of lever 16 longitudinal movement of shaft 15 to bring the key blank into proper position with relation to the cutting tool 25.

The supporting element 18 is secured to the base plate 11 by suitable bolts 26, support 18 being provided with upstanding pins 27, slidably mounted upon which guide pins is the plate 28, which in turn is formed at its top with the longitudinally extending V-shaped edge 29 (see Fig. 2). Interposed between plate 28 and support 18 is a coil spring 30, which normally urges the V-shaped edge 29 of plate 28 into contact with the circumferential edge of control plate 23, which circumferential edge is provided with spaced notches corresponding to the key cutting positions 0, 1, 2, 3, 4, 5, 6 and 7 (see Fig. 10).

As will be understood, when sufficient turning force is applied either to control head 23 or shaft 15 (assuming that edge 29 of plate 28 is in engagement with one of the notches), the inclination of the V-shaped top edge of plate 28 and the corresponding V-shaped contour of the notches will depress plate 28 against spring 30, and when the edge of control plate 23 has moved to the next notch, plate 28 under action of spring 30 will jump thereinto. It will thus be seen that control plate 23 can be set with any one of the notches in its edge in contact with the upper V-shaped edge of plate 28 as desired.

Head 14 is provided at one side with ears 31, between which is pivotally mounted at 32 the ear 33 formed at one end of the arm 34, the opposite end of which arm is provided with a slot 35, into and out of which slot swingably moves a threaded rod 36 pivoted at 37 in head 14, rod 36 having threaded upon its threaded end the adjusting nut 38. Formed in the central portion of the upper face of head 14 is the groove or notch 39, and formed in the central portion of the lower face of arm 34 is the notch 40, notches 39 and 40 being so formed as to firmly and snugly receive therebetween the master key 41 (Fig. 11). Due to the ribs and projections 42 and 43 of the master key, and the corresponding formation of the notches 39 and 40, the master key can be placed in these notches between head 14 and arm 34 only in one position, which insures that the master key will always be clamped in proper position for gauging the depths of cuts in the key blank being operated upon.

On pedestal 13 is formed the head 44 provided with a longitudinal bore 45, in which is rotatably mounted the tool holder 46, having at its inner end a head 47 and at its outer end a pinion 50, which pinion may be fixed to the tool holder 46 in any desired manner to impart rotation thereto. In Fig. 3 the outer or left-hand end of tool holder 46 is shown as reduced in diameter at 49 and threaded to receive pinion 50 and nut 51. The interior of the reduced portion 49 is also threaded to receive the threaded adjusting member 52, which carries the extension 53 for abutting against and adjustably positioning longitudinally the shank 54 of the cutting tool 25. Longitudinal adjustment of the cutting tool 25 can accordingly be effected by rotation of the adjusting member 52 by a screw driver inserted in notch 55 and rotating the same. When the proper adjustment is obtained cutting tool 25 will then be clamped in fixed position in the tool holder by means of the set screw 56.

Extending upwardly from head 44 is the arm 57, which carries at its upper end a head 58 having a longitudinal bore therethrough, in which is mounted a suitable shaft for rotatably carrying the driving gear 59, which driving gear is manually rotated by means of the handle 60. As will be understood, rotation of gear 59 will rotate pinion 50 and thus impart rotation to the cutter 25, which cutter is formed at its outer end with suitable cutting edges to cut notches in the tubular end 61 of the key blank 41, which notches, as will be later more fully pointed out, vary in depth, as seen in Fig. 11. As seen in Fig. 5 the cutter 25 is laterally offset from the axis of rotation of shaft 15 in order to so position cutter 25 that it will cut the grooves (as shown in Fig. 11) into the sides of the end portion of the key blank.

The head 14 in which shaft 15 is rotatably and longitudinally slidably mounted, is provided with an oil hole 62 for lubrication purposes.

The term "master key" is used herein to include any completed key that will operate the lock for which the new key to be cut is intended.

The chuck or gripping device 67 for fixedly holding the key blank in position while being cut will now be described. As seen in Figs. 3 and 4 the left-hand end (as viewed in these figures) of shaft 15 is enlarged at 68 and a transverse slot 69 formed centrally therein to extend from the free end a suitable distance inwardly along the shaft 15 to receive a key blank, and having a longitudinal central bore extending inwardly from the end of the enlarged portion 68 a distance sufficient to receive the tubular barrel 61 of the key blank. This bore is of three main diameters to receive the three main diameters of the key blank barrel as seen in Fig. 3, and so arranged that the free end of the barrel will protrude a sufficient distance to receive in its outer edge the grooves to be cut therein by the cutter 25 after the key blank has been firmly clamped in position. In other words, the bore is shaped to correspond to the shape of the enlarged portions of the key blank. Rotatably mounted upon the exterior of the enlarged portion 68 is a sleeve 70 formed on its outer edge with an annular flange 71, which extends only partially around the circumference of the enlarged portion 68. As seen in Figs. 1, 3, 4, 5, 6, 7 and 8, the sleeve 70 at its outer edge is cut back around substantially one-half of its circumference a distance sufficient to receive the arcuate lever arm 72, which is pivotally mounted at 73, by means of a removable set screw 74, for pivotal movement within the cut away portion 75 formed in the end of the enlarged portion 68 of shaft 15. The arcuate lever arm 72 functions as a cam and when in open position, as shown in Fig. 8, it extends outside of a circle representing the circumference of sleeve 70, which is the position it occupies when a key blank is being inserted into or removed from the chuck. After the key blank has been inserted into and properly positioned within the chuck, the sleeve 70, as viewed in Fig. 8, is rotated counter-clockwise, which causes the flange 71 and adjacent parts to ride over the outer edge of the lever 72 and swing it into position to tightly grip the key blank in the chuck as shown in Fig. 7. The key blank is then ready to be cut. After being cut the key blank is released from the chuck by rotating the sleeve 70 in a clockwise direction from the position shown in Fig. 7 to the position shown in Fig. 8, the shoulder 76 during this movement striking the free end of lever 72 and swinging it to open position as seen in Fig. 8. This loosens the key blank and permits its removal. It will be understood there are corresponding notches and projections on the key blank and chuck parts to insure that when the latter tightens the former in place, the key blank will always be held in exactly the right position so that when it has had the grooves cut into it these grooves will correspond in size and angular position with the grooves in the master-key.

The contour of the outer edge of lever 72 is such that when the extended end of sleeve 70 that is coextensive with flange 71 passes over the same when rotating the sleeve in a counter-clockwise direction (Figs. 7 and 8) the barrel of the key blank will be tightly gripped between the movable curved jaw 77 of lever 72 and the curved jaw 78 formed by the bore in the end of enlarged portion 68 of shaft 15. Jaw 78 is stationary relatively to jaw 77. This gripping pressure upon the key blank is maintained until sleeve 70 is rotated in a clockwise direction to release the same. Also as seen in Figs. 4, 7 and 8, some portion of the outer edge of lever 72 always extends at least a slight distance over the outer edge of sleeve 70 to prevent this sleeve from slipping off from over the end of the enlarged portion 68 until after the screw 74 and lever 72 is removed.

The control plate 23 (which will be hereinafter referred to as the key control plate to distinguish it from the code control plate 81 later to be described), is provided on its inner face (the left-hand face as viewed in Fig. 3) with a plurality of pairs of pins (eight pairs of these pins being shown in the drawings) $x0$—$y0$, $x1$—$y1$, $x2$—$y2$, $x3$—$y3$, $x4$—$y4$, $x5$—$y5$, $x6$—$y6$ and $x7$—$y7$. These pairs of pins are so arranged on the face of key control plate 23 that the $x$ pin of each pair will be in direct alignment with the circular interior of the tubular portion of the master key 41 when the center of this $x$ pin is on a vertical diametrical line at the top. As seen in Fig. 3, the master key is provided on its inner face with a rib portion 64 and each of the $x$ pins is provided with a notch 65 to fit over rib 64 when the $x$ pin enters the opening in the tubular portion of the master key. Since this rib 64 stands in a fixed position when the master key is clamped in its holding clamp, the notches 65 are so positioned on the $x$ pins that when these pins, respectively, reach their uppermost position this notch will point in the proper direction to slide over said rib 64.

In the particular construction illustrated in the drawings, there are seven grooves extending longitudinally to a greater or less depth in the circumference of the tubular portion of the master key, and seven corresponding longitudinal grooves are to be cut in the tubular portion of the key blank. There is also an external short rib 66 on the outside of the tubular portion of each of the master key and the key blank, these short ribs 66 lying directly opposite the internal rib 64 and extending to a position close to the outer end of the tubular portion. As these ribs are to fit in corresponding grooves in the lock to enable proper positioning of the same, it is not desired during cutting of the key blank to cut into this rib; hence the position of what would otherwise be a groove at this external rib 66 is designated 0. The other groove positions proceeding in sequence circumferentially around the tubular portion of the key are designated 1, 2, 3, 4, 5, 6 and 7. This gives eight positions, the 0 positions of each rib and blank (meaning no groove).

When eight of these positions are used in the key they will probably be separated 45° apart. This means that when rotating the key control plate 23 from one pair of pins to the next it must be rotated through 45°, and in order to hold plate 23 in each of these various positions the notches in the circumference of plate 23 are positioned opposite each pair of pins and 45° apart so that these notches will respectively engage detent 28 when the two pins of each pair are in proper registry with the master key.

As stated above, there are eight positions in the particular form of key described herein for illustrative purposes, the 0 position being blank and the positions from 1 to 7, inclusive, representing grooves of various lengths. As seen in Fig. 10, which is a view looking at the back side of the key control plate 23, when the $x0$—$y0$ pins are at the top, the axis of each of the $y$ pins of each pair will fall on a horizontal line passing through the axis of the $x$ pins. This means that as plate 23 is rotated from one notch to the next notch each of the $y$ pins will move through an angle of 45° with relation to the $x$ pins. This insures that each of the $y$ pins when it arrives at the top position will be in such angular position to slide into the external notch in the master key at the same time that the $x$ pins slide into the hollow interior of the master key. In other words, assuming the key control plate 23 to be in position shown in Fig. 10, with its 0 position in a vertical central line at the top, and the master key to be firmly clamped in its proper position in clamp 34—38, and a key blank to be firmly clamped in its chuck or clamping device described above, and movement of the top of lever 16 to the left as viewed in Fig. 3, the pin $x0$ will stand in alignment with the hollow interior of the tubular portion of the master key and would enter the same unless otherwise prevented.

This entry into said hollow interior is, however, prevented by reason of the $y0$ pin striking the end of said tubular portion of the master key, for the reason that there is no groove for it to enter. As the key control plate 23, the shaft 15 and the key blank chuck or holding means 67, and the key blank fixed therein, all move together both rotatively as well as longitudinally, it will be seen that whatever movement is given the key control plate 23, either rotatively or longitudinally, a simultaneous and equal movement will be given to the key blank. The key blank and cutter are so positioned that when the $y0$ pin contacts the end of the tubular portion of the master key the free end of the cutter 25 will just touch the outer end of the tubular portion of the key blank but not cut into the same. From this it is seen that when the operation referred to above takes place in the 0 position of the key control plate, no groove will be cut in the key blank. It is also understood from Fig. 10 that when the detent plate 28 is in the fourth notch it will hold the pins $x0$—$y0$ against lateral movement but will permit their longitudinal movement.

Assuming now that the key control plate 23, as viewed in Fig. 10, is rotated to the right at the top a distance of one notch, the resiliently mounted detent 28 will move out of notch 4, and when notch 5 arrives above it will spring into this latter notch and then hold pin $x1$ in alignment with the interior of the tubular portion of the master key and pin $y1$ will be in a position 45° below the horizontal, as clearly seen in Figs. 19 and 20. Movement of the upper end of lever 16 to the left as viewed in Fig. 3 (it being understood that the upper end of this lever was moved to the right when changing the key control plate 23 from one notch to the next), will cause pin $x1$ to enter the hollow interior of the tubular portion of the master key and pin $y1$ to enter that external notch in the tubular portion of the master key that is 45° below the 0 position or, in other words, the No. 1 groove of the master key, which is shown on the development of the end of this key in Fig. 16 and also shown in an elevation of the tubular end of the master key in Figs. 14 and 15. When the free end of pin $y1$ strikes the bottom of the groove the cutter 25 will have cut a groove of corresponding depth and corresponding angular position in the end of the tubular portion of the key blank held in chuck or clamping device 67. The upper end of lever 16, as viewed in Fig. 3, will then be moved to the right and the key control plate 23 rotated one more notch in the direction of the arrow, as viewed in Fig. 10, to bring the No. 2 position to the top and the detent 28 into the notch of the No. 6 position. This will bring the $x2$—$y2$ pins to the top in proper position so that when the upper end of lever 16 (Fig. 3) is again moved to the left the $x2$ pin will enter the hollow interior of the tubular portion of the master key and the $y2$ pin will enter the No. 2 external groove of the master key, the $y2$ pin when at the top being in a vertical line directly below the $x2$ pin. When the $y2$ pin strikes the end of the groove the cutter, due to the key blank having moved longitudinally and rotatively simultaneously and an equal amount with the plate 23, will have cut into the exterior surface of the end of the key bank and formed a groove therein of the same depth or length and angular position as the No. 2 groove in the master key.

The above operations will be repeated in a similar manner for each of the other groove positions 3, 4, 5, 6 and 7, with the result that corresponding grooves will be cut in the key blank for the reasons stated above. When thus completed the key blank will be removed from its chuck or gripping device and another key blank inserted if additional duplicates are to be made from the same master key. If other forms of keys are to be made a different master key will be inserted in its clamping device and a key blank operated upon in a similar manner to that described above. In other words, whatever may be the length of the grooves in the master key and the sequence of the same, corresponding grooves will be cut in the key blank, since the key blank and the key control plate 23 move together both rotatively and longitudinally.

The key cutting machines of the present invention is also capable of cutting duplicate keys by code without the use of a master key. When cutting keys by code the code or table of numbers and/or letters or other symbols (corresponding to the numbers, letters or symbols used in the machine) will be furnished by the original manufacturer of the keys or other custodian of the code or codes, and by referring to the numbers, letters or symbols in the code or table the control parts of the machine may be correspondingly set to cut a duplicate key corresponding to the code. For example, if the owner of the lock for which the duplicate key is to be cut knows the number of his key, the operator of the key cutting machine if he has a code for that key number, may refer to the same and cut the duplicate key by setting the control parts of the machine in succession for the different numbers, letters or the like in the code and cut the groove in the key blank for each setting so that the finished product is a duplicate key properly cut. The mechanism for effecting this cutting by code will now be described.

In the lower portion of pedestal 12 is mounted for longitudinal sliding movement a rod 79 having upon one end a knurled head 80 and upon the other end the code control plate 81. Between head 80 and pedestal 12 is positioned a coil spring 82 to normally hold the rod 79 to the left as viewed in Fig. 3, which tends to normally hold the code control plate 81 against the right-hand face of pedestal 12 as viewed in Fig. 3. The inner or left-hand face of code control plate 81 as viewed in Fig. 3, is formed with circularly spaced openings or depressions 83 of varying depth, which will be better understood in Fig. 23, which shows at K a development of code control plate 81, with the depressions in its inner face shown in development for convenience. Fixed in pedestal 12 is a pin 84 having a head 85 having a length to just reach to the bottom of the deepest depression in the inner face of the code control plate when the left-hand face of the same as viewed in Fig. 3 contacts with the right-hand face of pedestal 12. This hole in development K of Fig. 23 is indicated at H and the head of pin 84 is opposite this hole when the letter H on the edge of the control plate in Fig. 3 is opposite the arrow 86. Likewise when the other letters or indicia on the edge of code control plate 81 are opposite arrow 86 formed on the side of pedestal 12, the corresponding hole or depression shown in development K of Fig. 23 will be opposite head 85 of pin 84. This means that by pushing to the right on head 80 of rod 79 (Fig. 3), the coil spring 82 will be compressed and code control plate 81 pushed to the right far enough to clear head 85 of pin 84, thus enabling the code control plate 81 to be rotated any desired amount to bring any desired hole or depression in its inner face opposite head 85 of pin 84, which settings will be read from the code.

As stated above, in the operation of cutting keys by code now being described, no master key will be used but the depth of cut in the key blank will be gauged by the $x$—$y$ pins shown in Fig. 10 (all of the $x$—$y$ pins being the same length) striking the right-hand face of the code control plate 81 as viewed in Fig. 3. In other words, the right hand face of the code control plate 81 in Fig. 3 performs the same function as was performed by the $y$ pins striking the ends of the grooves in the master key when the cutting was performed by means of a master key. There being no master key when cutting by code the length of the grooves to be cut in the key blank will be governed by the *x—y* pins of Fig. 10 striking against the right-hand face of the code control plate 81 of Fig. 3; these various positions of contact of the *x—y* pins with the code control plate being varied by rotating the code control plate to various of the holes or depressions A—H, inclusive, on its inner face (shown in development K in Fig. 3).

It will be understood that various combinations of groove cuts can be made both as to length as well as angular position when it is kept in mind that the key control plate 23 can when cutting by code also be set to any of its various angular positions, which is simultaneously accompanied by the key blank being correspondingly positioned. The code will give for the various key numbers (which key when originally manufactured being given an individual number) the setting for both the code control plate 81 and the key control plate 23. From this it will be apparent that a wide variety of forms of keys may be cut by code without the use of a master key.

For example, assume that the code gives for the first groove or cut the letter A for the code control plate and the number 0 for the key control plate, all that is necessary to do is to set the code control plate 81 with the letter A opposite the arrowhead 86, and set the key control plate 23 with the No. 4 position notch (see Fig. 10) over the resilient detent 28, which will put the 0 position at the top. The cutter 25 is then rotated by means of the handle 60 and intervening gearing, and the upper end of the lever handle 16 (Fig. 3) pressed to the left until the *x—y* pins of the key control plate 23 strike the face of the code control plate, which insures that the length of the groove cut in the key blank will be proper for that position. Without going into unnecessary detail it will be understood that the various settings for both the code control plate and the key control plate may be read from the code or table and the respective settings on the machine made and the corresponding grooves cut in the key blank for the various positions to complete the key in accordance with the numbers, letters or other indicia given for the same in the code for that particular key number.

Fig. 23 endeavors to set forth diagrammatically and in development for the code control plate and the key control plate the relative combinations that can be effected by this system of key cutting by code. In addition to the development K of the holes or depressions in the code control plate there is shown in Fig. 23 a diagrammatic development M of the various positions to which the key control plate may be rotated. It will be understood from Fig. 23 and the above description that the depth or length of the grooves cut in the key blank will be controlled by the code control plate 81 (the *x—y* pins striking the same at the end of every cut), and the position or angularity of the cut or cuts on the key blank will be determined by the angular position to which the key control plate 23 may be rotated. In other words, the code control plate controls the depth of cut while the key control plate controls the position of the cut.

When the code control plate is not in use and in order that it will not interfere with use of the key control plate for cutting duplicate keys by use of a master key, the code control plate will first be moved to the position H shown in Fig. 3, so that head 85 of pin 84 will be in the deepest hole or depression H and thus permit the *x—y* pins to always be capable of sufficient movement to cut the longest or deepest groove required in the key blank, even when this is being done by use of a master key. In other words, when the head 85 of pin 84 is placed in the deepest depression in the code control plate, this will place the code control plate out of the way of the *x—y* pins to enable function of the latter for all the necessary ranges when cutting duplicate keys by means of a master key.

As further means for preventing the possibility of inserting the key blank in the chuck in an improper position, there is positioned on the outer face of the arcuate lever arm 72 a pin *p*, which when the key blank is inserted in the chuck with the wrong side toward pin *p*, this pin will strike the short rib 66, which latter will spread the arcuate lever arm 72 outwardly such a distance that the sleeve 70 cannot ride thereover, thus making it impossible to lock the key in the chuck. When, however, the key is properly positioned in the chuck with the short rib on the side away from the pin, the absence of this short rib 66 will permit pin *p* to move to the position shown in Figs. 4 and 7. As will be readily understood, this further prevents the gripping of the key in the chuck in anything but the proper cutting position.

Having now described our invention,
We claim:

1. In apparatus of the class described, a rotatable longitudinally movable shaft, a key blank holding chuck and a key control plate on said shaft fixed to move therewith, a cutter adapted to make cuts in the key blank held in the chuck, a clamp adjacent said plate, the clamp being adapted to fixedly and releasably hold a master key having different depth cuts like those to be formed in a key blank held in the chuck, said plate having a series of spaced gauge pins on one face, each of said pins being movable with the plate into registry with one of the cuts in the master key and then movable longitudinally into said cut to control the depth of the various cuts being made by the cutter in the key blank.

2. In apparatus of the class described, a rotatable longitudinally movable shaft, a key blank holding chuck and a key control plate on said shaft fixed to move therewith, a cutter adapted to make cuts in the key blank held in the chuck, a clamp adjacent said plate, the clamp being adapted to fixedly and releasably hold a master key having different depth cuts like those to be formed in a key blank held in the chuck, said plate having a series of spaced gauge pins on one face, each of said pins being movable with the plate into registry with one of the cuts in the master key and then movable longitudinally into said cut to control the depth of the various cuts being made by the cutter in the key blank, and a series of centering pins on said plate each adapted for entering the end of the master key to insure proper positioning of the gauge pins with relation to its respective cuts in the master key.

3. In apparatus of the class described, a rotatable longitudinally movable shaft, a key blank holding chuck and a key control plate on said shaft fixed to move therewith, a cutter adapted to make cuts in the key blank held in the chuck, a clamp adjacent said plate, the clamp being adapted to fixedly and releasably hold a master key having different depth cuts like those to be formed in a key blank held in the chuck, said plate having a series of spaced gauge pins on one face, each of said pins being movable with the plate into registry with one of the cuts in the master key and then movable longitudinally into said cut to control the depth of the various cuts being made by the cutter in the key blank, and a series of centering pins on said plate each adapted for entering the end of the master key to insure proper positioning of the gauge pins with relation to its respective cuts in the master key, said plate being formed in its circumference with a notch opposite each centering pin, and a resilient detent adapted to selectively enter said notches to hold the plate against rotation.

4. In apparatus of the class described, a rotatable longitudinally movable shaft, a key blank holding chuck and a key control plate on said shaft fixed to move therewith, a cutter adapted to make cuts in the key blank held in the chuck, a clamp adjacent said plate, the clamp being adapted to fixedly and releasably hold a master key having different depth cuts like those to be formed in a key blank held in the chuck, said plate having a series of spaced gauge pins on one face, each of said pins being movable with the plate into registry with one of the cuts in the master key and then movable longitudinally into said cut to control the depth of the various cuts being made by the cutter in the key blank, and a series of centering pins on said plate each adapted for entering the end of the master key to insure proper positioning of the gauge pins with relation to its respective cuts in the master key, said plate being formed in its circumference with a notch opposite each centering pin, and a resilient detent adapted to selectively enter said notches to hold the plate against rotation, said plate being longitudinally slidable along said detent.

5. In apparatus of the class described, a cutter mounted for rotation but held against longitudinal movement, means for rotating said cutter, a key blank holding and gripping device adjacent said cutter and adapted to grip a key blank therein, a key control plate, said key blank holding device and key control plate being mounted for rotation and longitudinal movement together, a master key clamping device adjacent said plate and adapted to fixedly hold a master key having grooves of varying length around its circumference at the open end of its barrel, pins on said key control plate adapted to move into said grooves when brought into registry therewith so as to control the length of similar grooves to be cut into the key blank as the key blank is moved longitudinally, and means for moving said key control plate and key blank longitudinally whereby grooves will be cut in the key blank corresponding to those in the master key.

6. In apparatus of the class described, a rotatable cutter held against longitudinal movement, means adjacent said cutter for firmly clamping a tubular key blank, a key control plate, said key blank clamping means and said key control plate being mounted to rotate and move longitudinally together, means adjacent said key control plate for fixedly clamping a tubular key having varying depth grooves to be duplicated in the key blank, gauge pins of equal length circumferentially spaced on the face of said key control plate and adapted to be selectively brought into registry with the grooves in the key by rotation of the plate, the latter rotation being accompanied by simultaneous and equal rotation of the key blank, means for causing simultaneous longitudinal movement of the plate and key blank, whereby when one of the gauge pins strikes against the ungrooved end of the key no groove will be cut in the key blank, and when one of said pins enters a groove in the key a corresponding groove will be cut in the key blank.

7. In apparatus of the class described, a rotatable cutter held against longitudinal movement, means adjacent said cutter for firmly clamping a tubular key blank, a key control plate, said key blank clamping means and said key control plate being mounted to rotate and move longitudinally together, means adjacent said key control plate for fixedly clamping a tubular key having varying depth grooves to be duplicated in the key blank, gauge pins of equal length circumferentially spaced on the face of said key control plate and adapted to be selectively brought into registry with the grooves in the key by rotation of the plate, the latter rotation being accompanied by simultaneous and equal rotation of the key blank, means for causing simultaneous longitudinal movement of the plate and key blank, whereby when one of the gauge pins strikes against the ungrooved end of the key no groove will be cut in the key blank, and when one of said pins enters a groove in the key a corresponding groove will be cut in the key blank, the simultaneous rotation of the key control plate and the key blank causing the varying depth grooves in the key to be duplicated in the same sequence in the key blank.

8. In a key cutting machine, a cutter, means for rotating said cutter, a key blank gripping device adjacent said cutter and adapted to present a key blank to the cutter to be cut, a plate having a series of pins on one face, said plate and said key blank gripping device being mounted for longitudinal movement and rotation together, a second plate having a series of depressions of varying depths in one face and mounted for rotational movement and a limited longitudinal movement, yieldable means for normally urging said second plate in one longitudinal direction, a fixed pin over which the depressions are adapted to be selectively positioned to hold the second plate at different longitudinal positions, whereby one or more of the pins of the first mentioned plate will contact the second plate and thus limit the amount of longitudinal movement of the first mentioned plate and the key blank.

9. In a key cutting machine, a cutter, a key blank gripping device mounted for rotational and longitudinal movement, a plate mounted for simultaneous movement with the gripping device, a second plate adjustable to various longitudinal positions, the second plate having a series of different depth notches, a stationary projection over which said notches may be selectively placed, the amount of longitudinal movement of the first mentioned plate being controlled by the second plate whereby the amount of longitudinal movement of the gripping device may be selectively varied to enable cuts of varying depths to be made in the key blank held in the gripping device.

10. In a key cutting machine, a cutter, a key blank holder adapted to move a key blank toward and away from the cutter, means for controlling the depth of the cuts in the blank from a finished key, including projections which selectively move into the grooves of the finished key and cause the key blank to move a corresponding distance longitudinally against the cutter, and means for controlling the depth of the cuts in the blank from code indicia.

11. A gripping device comprising a head having a longitudinal opening formed therein adapted to seat an article to be operated on, an extension on said head, an arcuate seat in said extension, a lever pivotally mounted on the end of said head, said lever having an arcuate seat facing the first mentioned arcuate seat and movable toward and away therefrom, a sleeve rotatably mounted on the head and having a portion which when the sleeve is rotated in one direction will have a cam action on the lever and cause it to swing toward the first mentioned arcuate seat to firmly clamp an article to be operated on between the two arcuate seats.

12. A gripping device comprising a head having a fixed seat, a lever swingably mounted on said head and having a seat facing the first mentioned seat, and a sleeve rotatably mounted on said head and having a portion to force said seats toward each other when the sleeve is rotated in one direction, said sleeve having another portion to forcibly swing said lever away from the fixed seat when the sleeve is rotated in the opposite direction.

13. A gripping device comprising a head having a fixed seat, a lever swingably mounted on said head and having a seat facing the first mentioned seat, and a sleeve rotatably mounted on said head and having a portion to force said seats toward each other when the sleeve is rotated in one direction, said sleeve having another portion to forcibly swing said lever away from the fixed seat when the sleeve is rotated in the opposite direction, and means for preventing the gripping of the key in anything but the proper cutting position.

14. In a lock key cutting machine, a support, a shaft rotatably mounted in said support and longitudinally slidable therein, a key blank holding chuck on said shaft, a clamp on the support adapted to fixedly hold a master key, a key control plate fixed to said shaft, a cutter adapted to make cuts into the key blank held in the chuck, and means on said key control plate for controlling the depth of said cuts by contact with the master key, said means including a plurality of projections of varying length each being selectively insertable into a groove in the master key to cause the cutter to cut a corresponding groove longitudinally of the key blank and into the end thereof.

15. In a lock key cutting machine a support, a shaft rotatably mounted in said support and longitudinally slidable therein, a key blank holding chuck on said shaft, a cutter, means on said support for fixedly holding a master key, and means fixed to the shaft and including a plurality of projections of varying length adapted to be selectively inserted into the grooves in the master key to control the amount of longitudinal distance the key blank moves against the cutter.

16. In a lock key cutting machine, a support, a shaft rotatably mounted in said support and longitudinally slidable therein, a key blank holding chuck on said shaft, a clamp on the support adapted to fixedly hold a master key, a key control plate fixed to said shaft, a cutter adapted to make cuts into the key blank held in the chuck, and means on said key control plate for controlling the depth of said cuts by contact with the master key, said means comprising a plurality of spaced pins one for each depth of cut.

17. In a lock key cutting machine, a key control plate and a key blank holding chuck mounted for simultaneous and equal rotational and longitudinal movement together, a master key holder, a cutter adapted to make cuts into the key blank held in said chuck, and means on said key control plate for controlling the depth of said cuts by contact with the master key, said means comprising a separate pin for each depth of cut.

18. In a lock key cutting machine, a control plate and a key blank holding chuck, a master key holder, a cutter adapted to make cuts into the key blank held in said chuck, and means for variably controlling the depth of said cuts by longitudinal contact with the master key, said means comprising a separate pin on said control plate for each depth of cut.

19. In a lock key cutting machine, a control plate and a key blank holding chuck, a cutter adapted to make cuts into the key blank held in said chuck, and means for variably controlling the depth of said cuts, said means including a master key having cuts like those to be cut in the key blank, the control plate having contact with the master key longitudinally thereof by means of a separate pin for each depth of cut.

20. In a lock key cutting machine, a rotatable cutter, means for holding said cutter against longitudinal movement, means for rotating said cutter, a key blank gripping device mounted for rotational and longitudinal movement to present different portions of the end of the key blank to the cutter, a master key holder, and means for contacting the master key for controlling the amount of longitudinal movement of the key blank to vary and control the depth of cut of the cutter into the end of the key blank, said means comprising a key control plate movable synchronously with said key blank, and a separate pin on said key control plate for each depth of cut.

HARRY F. GEORGE.
JULIUS G. HOWARD.

CERTIFICATE OF CORRECTION.

Patent No. 2,129,087. September 6, 1938.

HARRY F. GEORGE, ET AL.

It is hereby certified that error appears in the printed specification of the above numbered patent requiring correction as follows: Page 1, first column, line 2, for the word "and" second occurrence, read a; page 3, second column, line 18, for "and" read a; page 4, first column, line 13, after "above" insert it; line 54, for "bank" read blank; and that the said Letters Patent should be read with this correction therein that the same may conform to the record of the case in the Patent Office.

Signed and sealed this 25th day of October, A. D. 1938

Henry Van Arsdale (Seal)

Acting Commissioner of Patents.